United States Patent
Priest

(10) Patent No.: US 7,456,522 B2
(45) Date of Patent: Nov. 25, 2008

(54) LINE POWERING OF AUXILIARY EQUIPMENT

(75) Inventor: Joel Priest, Raleigh, NC (US)

(73) Assignee: ADC DSL Systems, Inc., Eden Prairie, MN (*) Notice: Subject to any disclaimer, the term of this patent is extended or adjusted under 35 U.S.C. 154(b) by 20 days.

(21) Appl. No.: 11/272,653

(22) Filed: Nov. 14, 2005

(65) Prior Publication Data

US 2006/0061928 A1 Mar. 23, 2006

Related U.S. Application Data

(62) Division of application No. 10/162,494, filed on Jun. 3, 2002, now Pat. No. 6,992,404.

(51) Int. Cl.
*H02J 1/00* (2006.01)
(52) U.S. Cl. .......................................... 307/80; 379/413
(58) Field of Classification Search .................. 307/80, 307/1; 375/222; 379/413
See application file for complete search history.

(56) References Cited

U.S. PATENT DOCUMENTS

| 4,164,661 A |   | 8/1979  | Hucker et al. |          |
|-------------|---|---------|---------------|----------|
| 4,493,194 A | * | 1/1985  | Briccetti     | 62/180   |
| 5,115,386 A |   | 5/1992  | Shirahama et al. |       |
| 5,675,480 A | * | 10/1997 | Stanford      | 307/58   |
| 6,225,911 B1 |  | 5/2001  | Nagamasa et al. |       |
| 6,335,654 B1 |  | 1/2002  | Cole          |          |
| 6,429,706 B1 |  | 8/2002  | Amin et al.   |          |
| 6,489,690 B1 | * | 12/2002 | Hatsugai et al. | 290/1 A |
| 6,768,225 B2 |  | 7/2004  | Chang et al.  |          |
| 6,917,124 B2 | * | 7/2005  | Shetler et al. | 307/66  |
| 7,133,441 B1 | * | 11/2006 | Barlev et al. | 375/222 |
| 2003/0052544 A1 | * | 3/2003 | Yamamoto et al. | 307/66 |

FOREIGN PATENT DOCUMENTS

| WO | WO0033488    | * | 6/2000 |
|----|--------------|---|--------|
| WO | WO 0167590 A1 | * | 9/2001 |

OTHER PUBLICATIONS

McNeill, John, Boost Converter Provides Temperature-Controlled Operation of 12V fan from +5V Supply, Electronic Design Magazine, pp. 98-100, Dec. 18, 1997, USA.

* cited by examiner

*Primary Examiner*—Stephen W Jackson
*Assistant Examiner*—Daniel Cavallari
(74) *Attorney, Agent, or Firm*—Fogg & Powers LLC

(57) ABSTRACT

An electronics module for powering auxiliary equipment by using power from a line powered remote unit is provided. The electronics module includes one or more current and inrush limiting control circuits, one or more turn on control circuits, and a voltage control summer which operate to control the output voltage from the electronics module to the auxiliary equipment. The electronics module also includes one or more input switch and current limiter circuits, one or more input filters, and a pulse width modulator power stage and output filter circuit which operate to combine power from one or more remote units into a single power output. Additionally, the electronics module includes a fault monitoring circuit for determining if a fault has occurred in the auxiliary equipment.

9 Claims, 14 Drawing Sheets

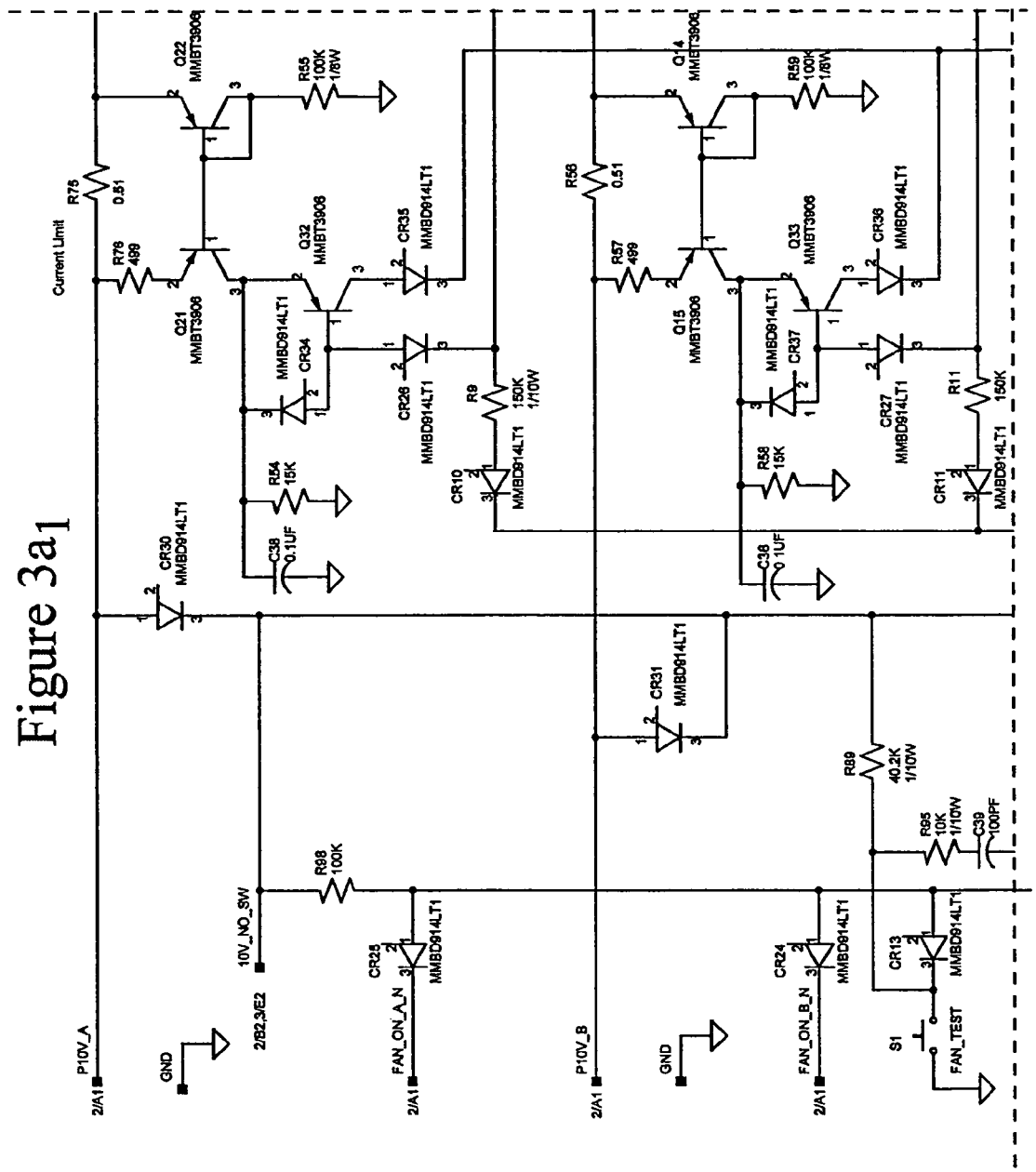
Figure 3a₁

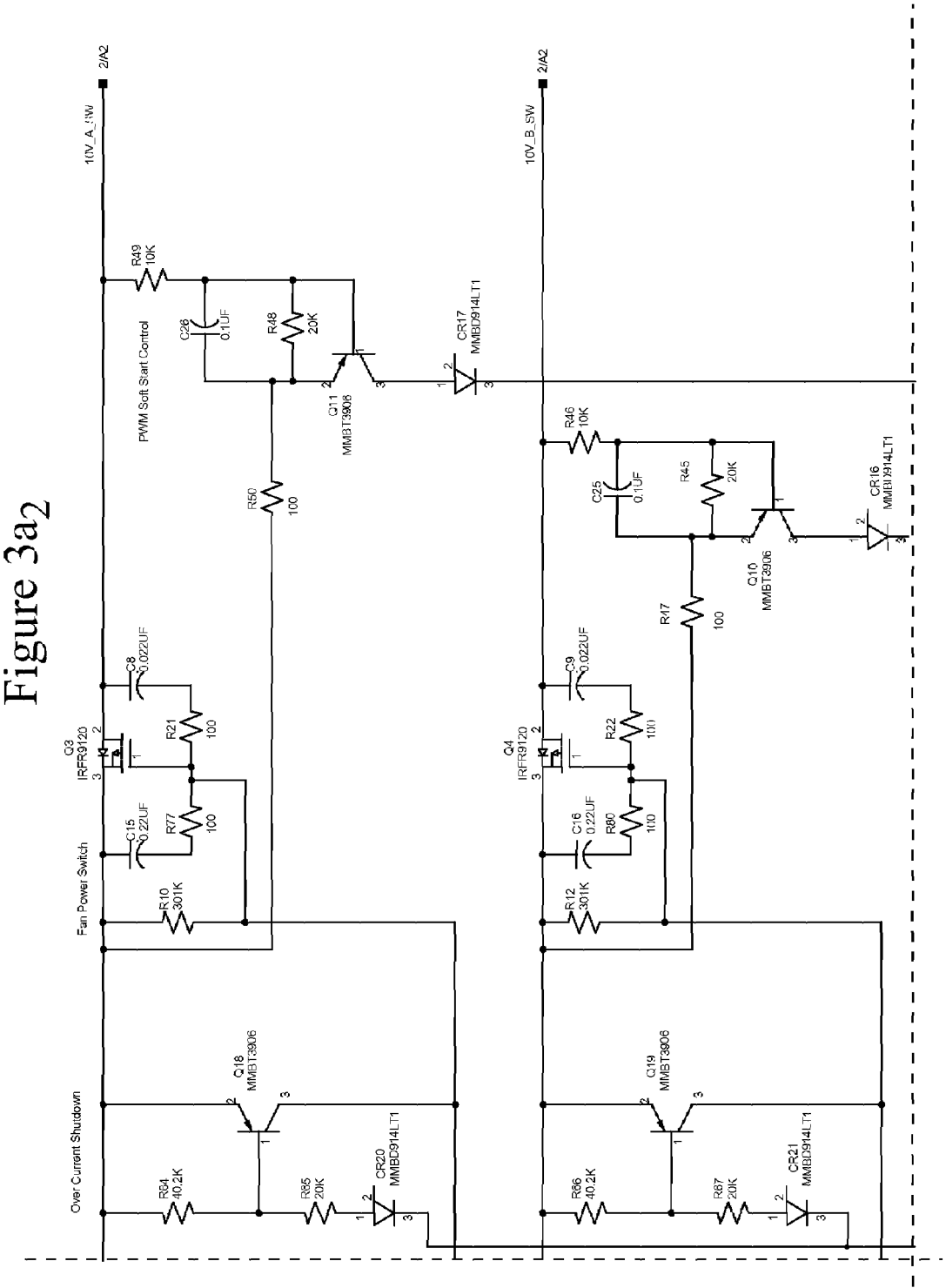
Figure 3a₂

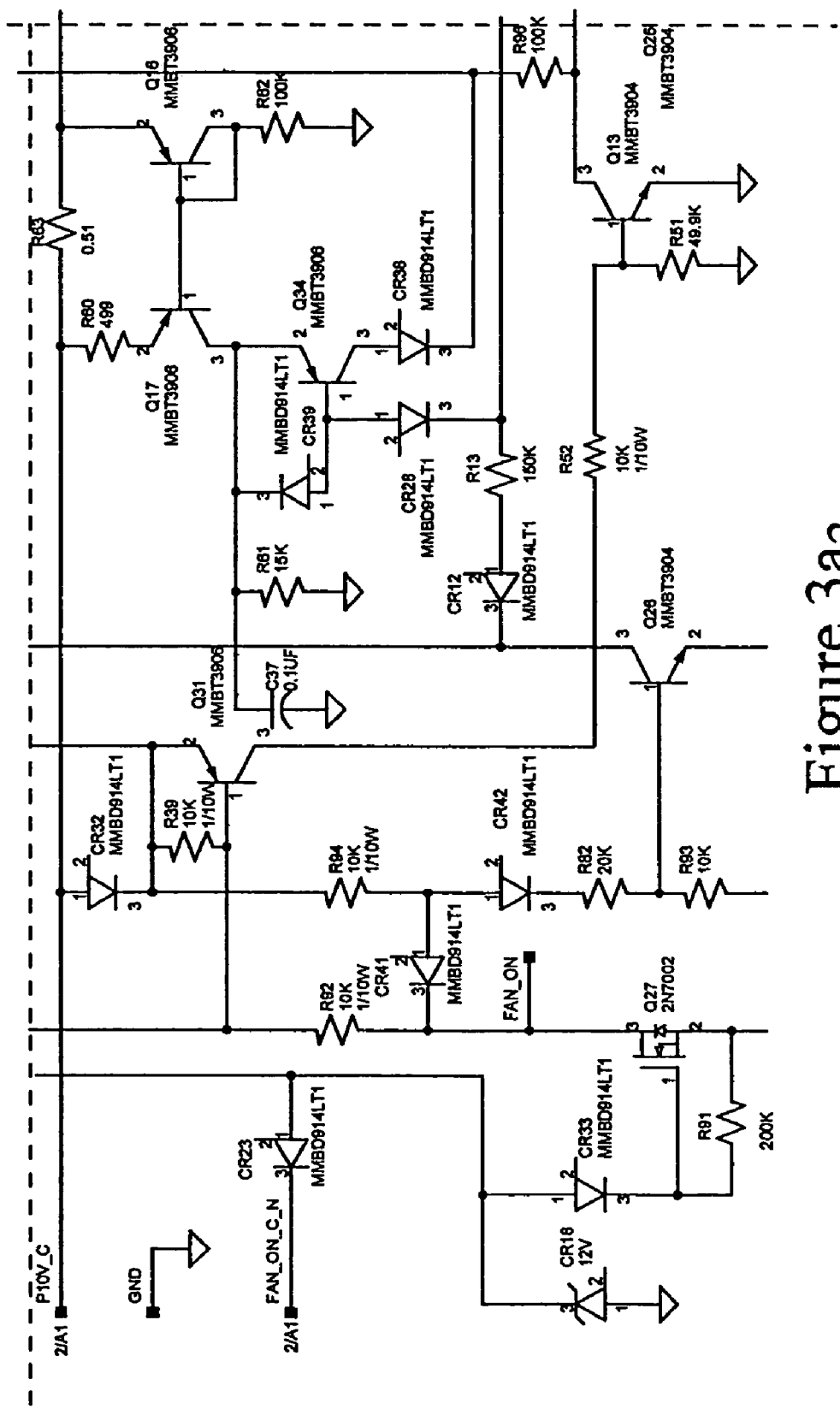
Figure 3a3

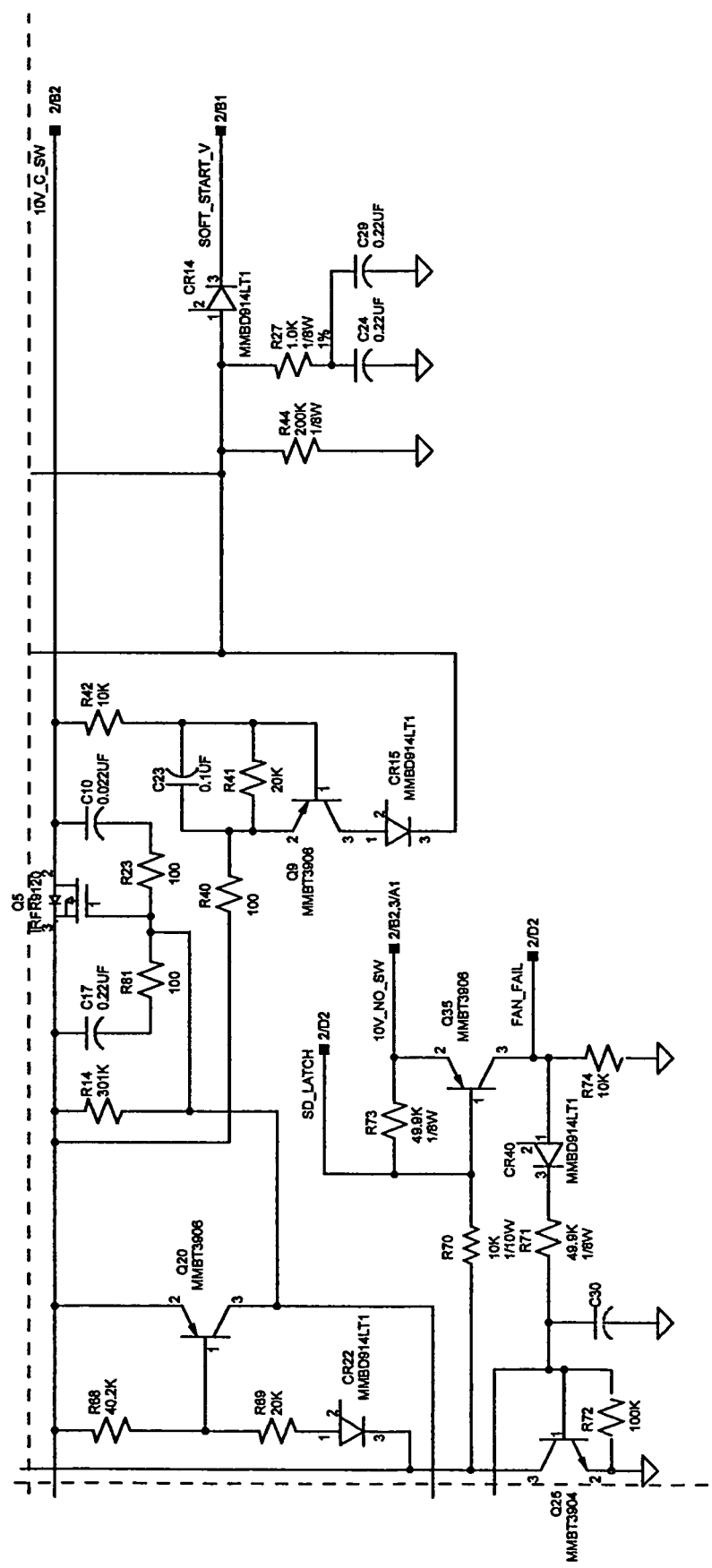
Figure 3a4

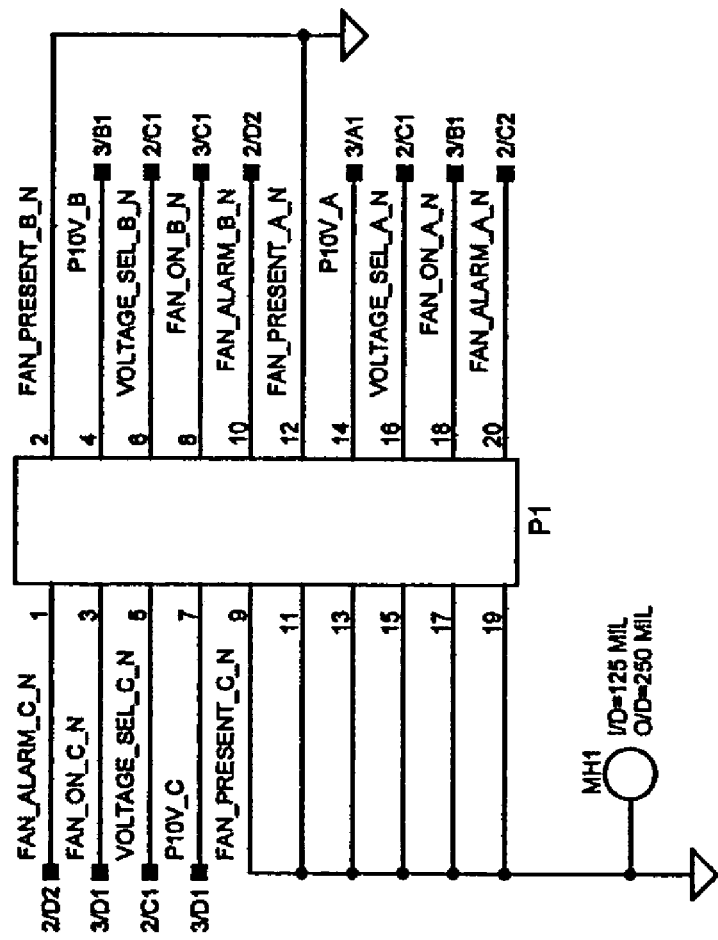
Figure 3b₁

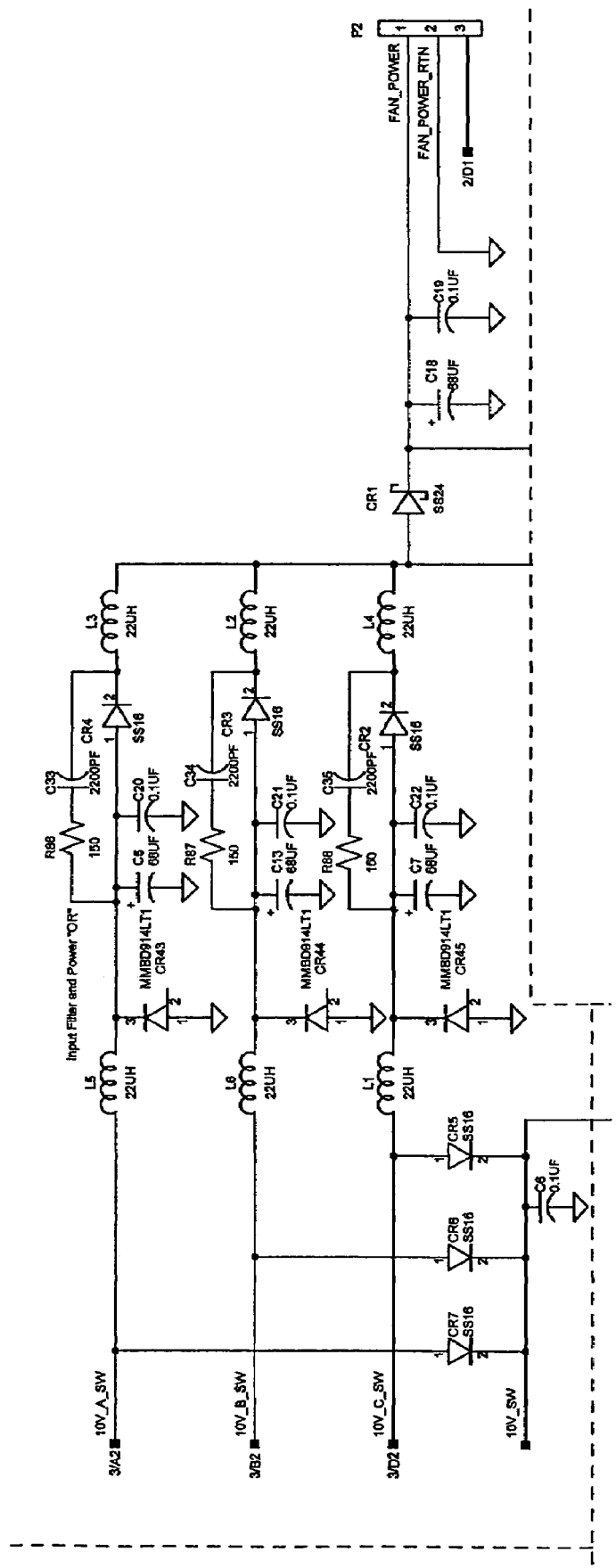
Figure 3b₂

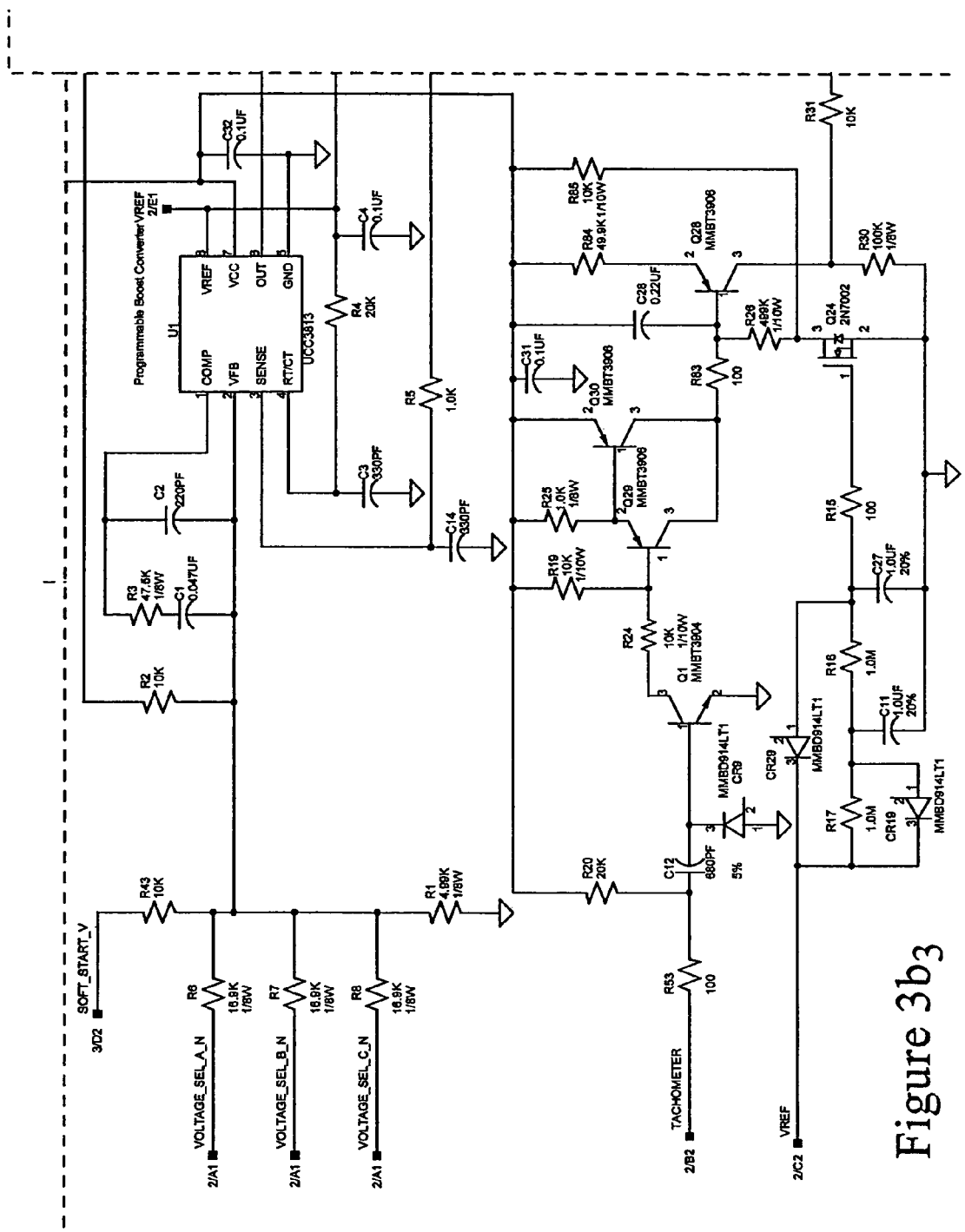
Figure 3b₃

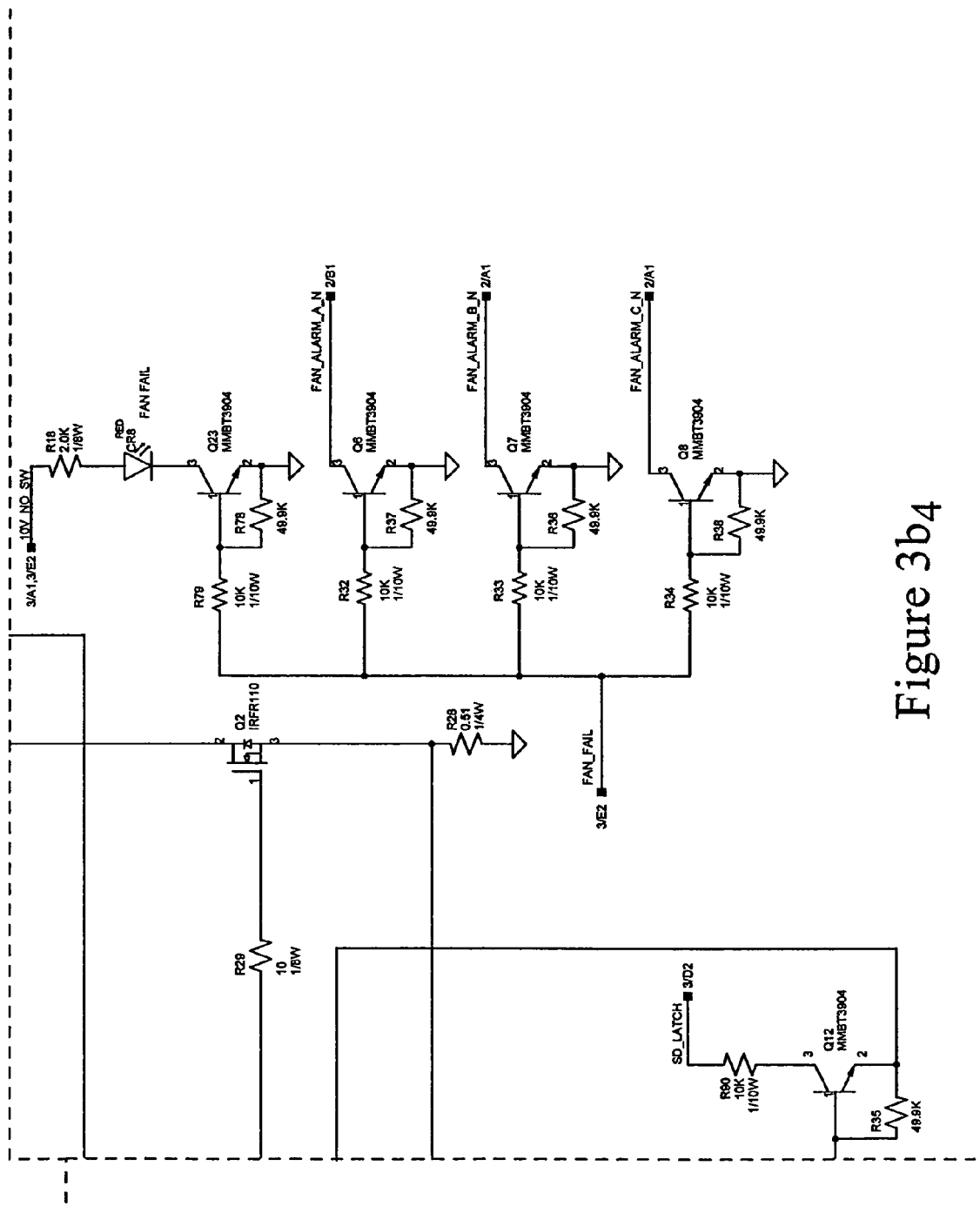
Figure 3b₄

US 7,456,522 B2

LINE POWERING OF AUXILIARY EQUIPMENT

CROSS REFERENCE TO APPLICATION

This application is a divisional of application Ser. No. 10/162,494 (U.S. Pat. No. 6,992,404), filed on 3 Jun. 2002 and entitled LINE POWERING OF AUXILIARY EQUIPMENT (the '494 application). The '494 application is incorporated herein by reference.

TECHNICAL FIELD

The present invention relates generally to the field of electronic circuits and, in particular, to line powering auxiliary equipment.

BACKGROUND

The telephone distribution system is changing and has changed from the old technique of one telephone per pair of wires in the distribution network to multiple digitally encoded phone connections per pair of wires, over at least part of the distribution network. An assembly (the Remote Unit) then decodes the digital data and distributes the information to multiple telephones. This change requires more power than that available or needed to power a simple telephone. The additional power has been traditionally supplied by a high direct current voltage delivered over the distribution system wire pairs (pair gain) to a remote unit using the same wire pair that carries the digitally encoded telephone traffic, or by local power utility company power. The preferred method for the telephone company is the line powered approach. This reduces the dependency of the telephone company on the local power grid. This allows the telephone company to maintain service even during power outages in the power utility network.

In many situations power is not only needed to run the telecommunications equipment but to provide power for other services such as monitoring, fault detection, cooling, life line services, and the like. With the increasing demand for data and limitations on power from central offices there is often insufficient power available to provide additional services by a single piece of equipment. In these types of situations any excess power available is often unused or unavailable The increased complexity of remote equipment generally causes higher power requirements. With the increase in power at the remote unit thermal considerations become more important, in fact cooling air may be required. Additionally, the transmittable distance for the digital data, the power source voltage and wattage and the wiring loss, determine the signal source transmit distance. Both the power source and voltage are limited by constraints on the signal source. The minimum wire size and the length of the wire determine the wiring power loss. Since few of these constraints can be changed at the remote unit there is a need to minimize the power at the remote unit.

For the reasons stated above, and for other reasons stated below which will become apparent to those skilled in the art upon reading and understanding the present specification, there is a need in the art for a technique for providing cooling at remote units while minimizing power requirements.

SUMMARY

The above-mentioned problems with power and other problems are addressed by embodiments of the present invention and will be understood by reading and studying the following specification. Specifically, embodiments of the present invention provide for power to auxiliary equipment. Embodiments of the present invention provide power for one or more fans to provide cooling to remote assemblies.

In one embodiment, an electronics module is provided. The module includes a control circuit, comprising one or more current and inrush limiting control circuits adapted to receive power from each of one or more line powered remote units, one or more turn on control circuits adapted to receive an on signal from each of the one or more line powered remote units, and a voltage control summer adapted to receive a voltage select signal from each of the one or more line powered remote units, an input power sharing circuit, comprising one or more input switch and current limiter circuits coupled to each of the one or more current and inrush limiting control circuits, one or more input filters coupled to each of the one or more input switch and current limiter circuits, and a pulse width modulator power stage and output filter circuit coupled to each of the one or more input filters, wherein the pulse width modulator power stage and output filter circuit provides power to auxiliary equipment at varying power levels, a fault monitoring circuit, and wherein the voltage control summer controls a voltage output to the pulse width modulator power stage and output filter circuit.

BRIEF DESCRIPTION OF THE DRAWINGS

FIGS. 3A-1 to 3A-4 and 3B-1 to 3B-4 comprise schematic of a telecommunications system according to the teachings of the present invention.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention address problems with powering auxiliary equipment via line powered equipment of remote assemblies. Embodiments of the invention solve the power requirement problem in a simple and cost effective manner with an input power sharing circuit and control circuitry. Advantageously, the power available from each remote unit within a remote assembly is shared to provide sufficient power to run the auxiliary equipment, for example a cooling fan unit. Embodiments of the present invention also address minimizing the power requirements for the auxiliary equipment. In one embodiment, providing a thermostatically controlled variable speed fan unit.

Figure 1:
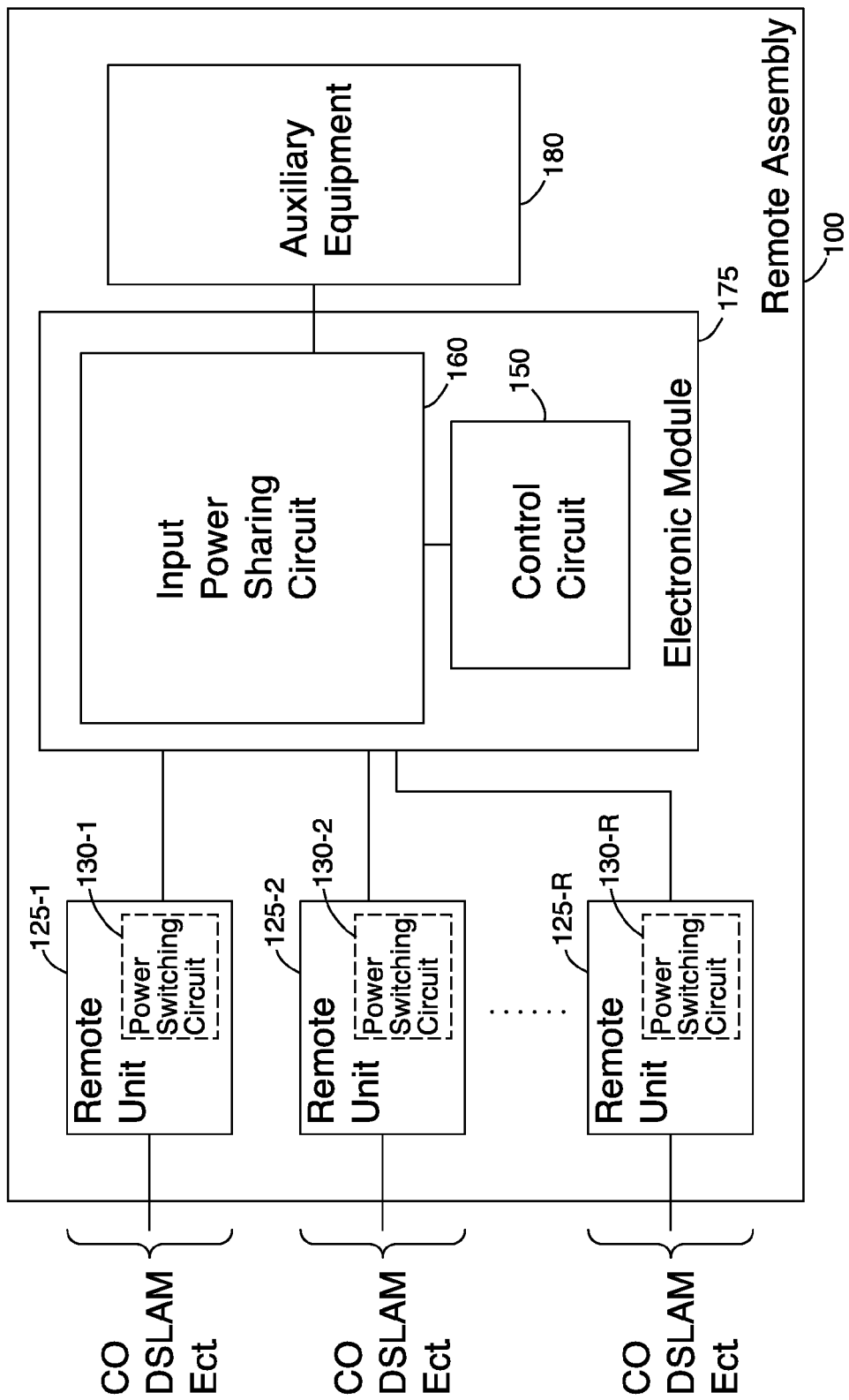
FIG. 1 is a block diagram of one embodiment of a telecommunications system according to the teachings of the present invention.

FIG. 1 is a block diagram of one embodiment of the present invention. Remote assembly 100 includes multiple remote units 125, an electronic module 175 and auxiliary equipment 180. One or more of remote units 125 powers auxiliary equipment 180. Each remote unit 125-1 to 125-R is line powered and receives power from a central office, digital subscriber line access multiplexer, digital loop carrier or the like. In one embodiment, each of the remote units 125 provides one or more of phone and data services to subscribers.

Electronic module 175 includes an input power sharing circuit 160 and a control circuit 150. Input power sharing circuit 160 receives power from one or more of remote units 125 and provides power to auxiliary equipment 180. In one embodiment, input power sharing circuit 160 is as described in U.S. Pat. No. 6,841,897 entitled "Input Power Sharing," which is commonly assigned and incorporated herein by reference, hereinafter referred to as the '897 patent. Input power sharing circuit 160 enables power from multiple independent sources such as remote units 125 to be shared by auxiliary equipment 180.

Electronic module 175 varies the output voltage driving the auxiliary equipment 180 depending on the number of remote units 125 installed and operating. Control circuit 150 attempts to force the power drawn from each of the remote units 125 to be equal. Control circuit 150 also provides control for one or more of the following, turning on the auxiliary equipment and associated circuitry at electronic module 175, current and in rush limiting control, over current protection, fault monitoring, testing, or the like.

In one embodiment, remote units 125-1 to 125-R provide voice, data, high bit rate digital subscriber line (HDSL), asymmetric digital subscriber line (ADSL), wireless, cable or optical interfaces, or the like that have line powered capabilities. In another embodiment, remote assembly 100 receives only DC power and no telephone or data services are provided.

In one embodiment, each of remote units 125 provide multiple high-speed digital services (e.g. ADSL) to eight subscribers. In one embodiment, remote units 125 are packaged in a common chassis or enclosure, the remote assembly 100. In one embodiment, remote assembly 100 houses up to three remote units. The total power required for the remote assembly 100 is a function of both the number of remote units 125 installed in the remote assembly 100 and the number of subscribers connected to each remote unit 125.

The electronics in each remote unit 125 required to support high-speed digital services dissipates a significant amount of heat within a common chassis or enclosure 100. In remote enclosure 100 with no provisions for cooling the enclosure, temperatures may exceed electronic device ratings. In one embodiment, auxiliary equipment 180 includes one or more of life line services, monitoring, fault detection, pressurization, heat dissipation such as a cooling fan, and the like. In one or more of these embodiments, remote units 125 will require additional circuitry 130 such as power monitoring, pressure monitoring, temperature monitoring, or the like. In one embodiment auxiliary equipment 180 is a fan for cooling the electronics within remote assembly 100 and each remote unit 125 includes a temperature sensor 130. In one embodiment, temperature sensor 130 comprises a temperature switch (thermostat), thermocouple, resistive temperature device (RTD), an integrated circuit with a temperature output, or the like. The fan 180 is line powered via power shared from each remote unit 125 installed and operating. The speed of fan 180 is controlled based on the number of installed remote units 125 and temperature sensor 130. The speed of fan 180 is not just based on the absolute temperature of the heat sensitive element of temperature sensor 130 but the temperature in correlation with the available power.

Figure 2A:
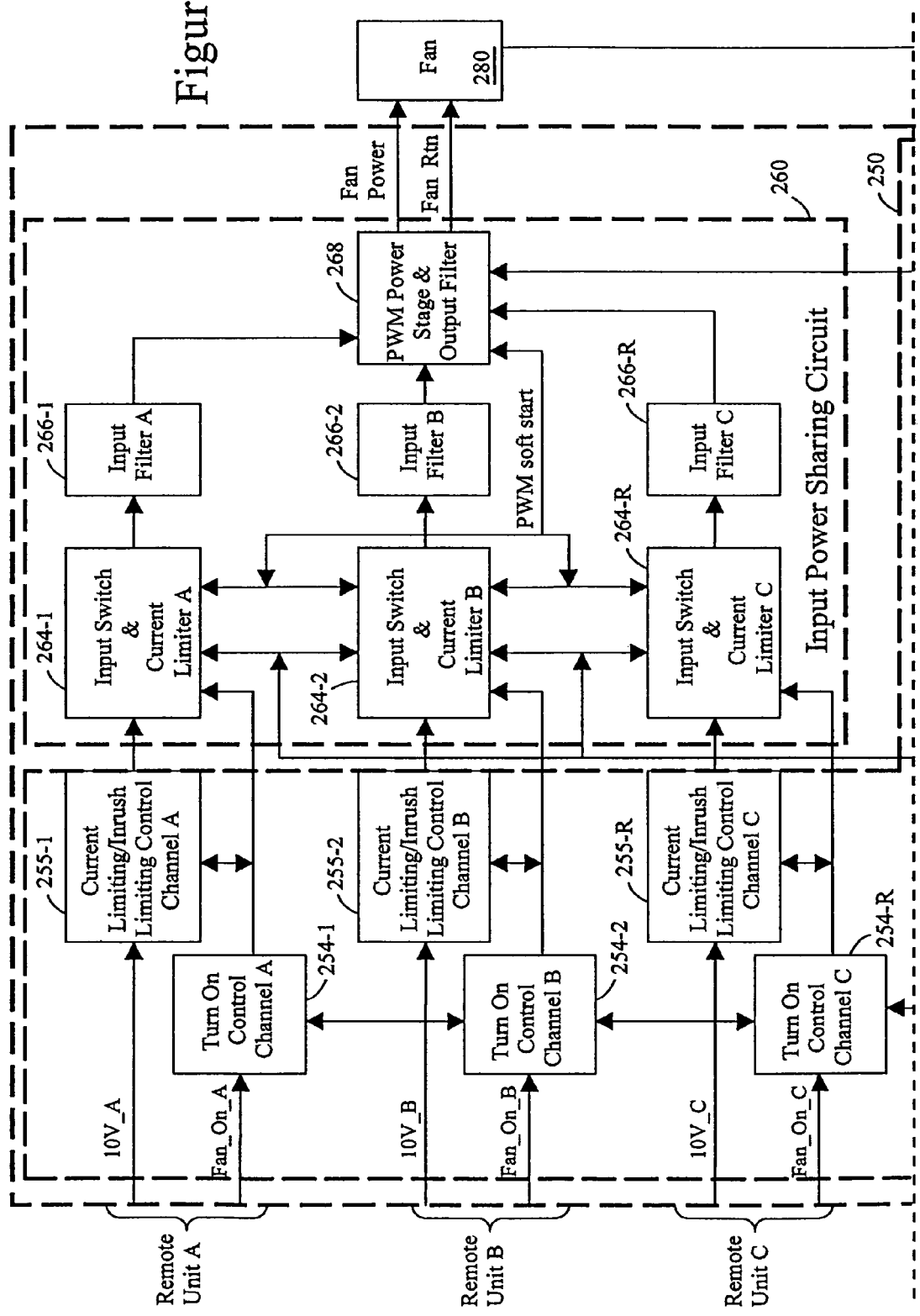
FIG. 2 consisting of FIGS. 2A and 2B comprise a block diagram of another telecommunications system according to the teachings of the present invention.
Figure 2B:
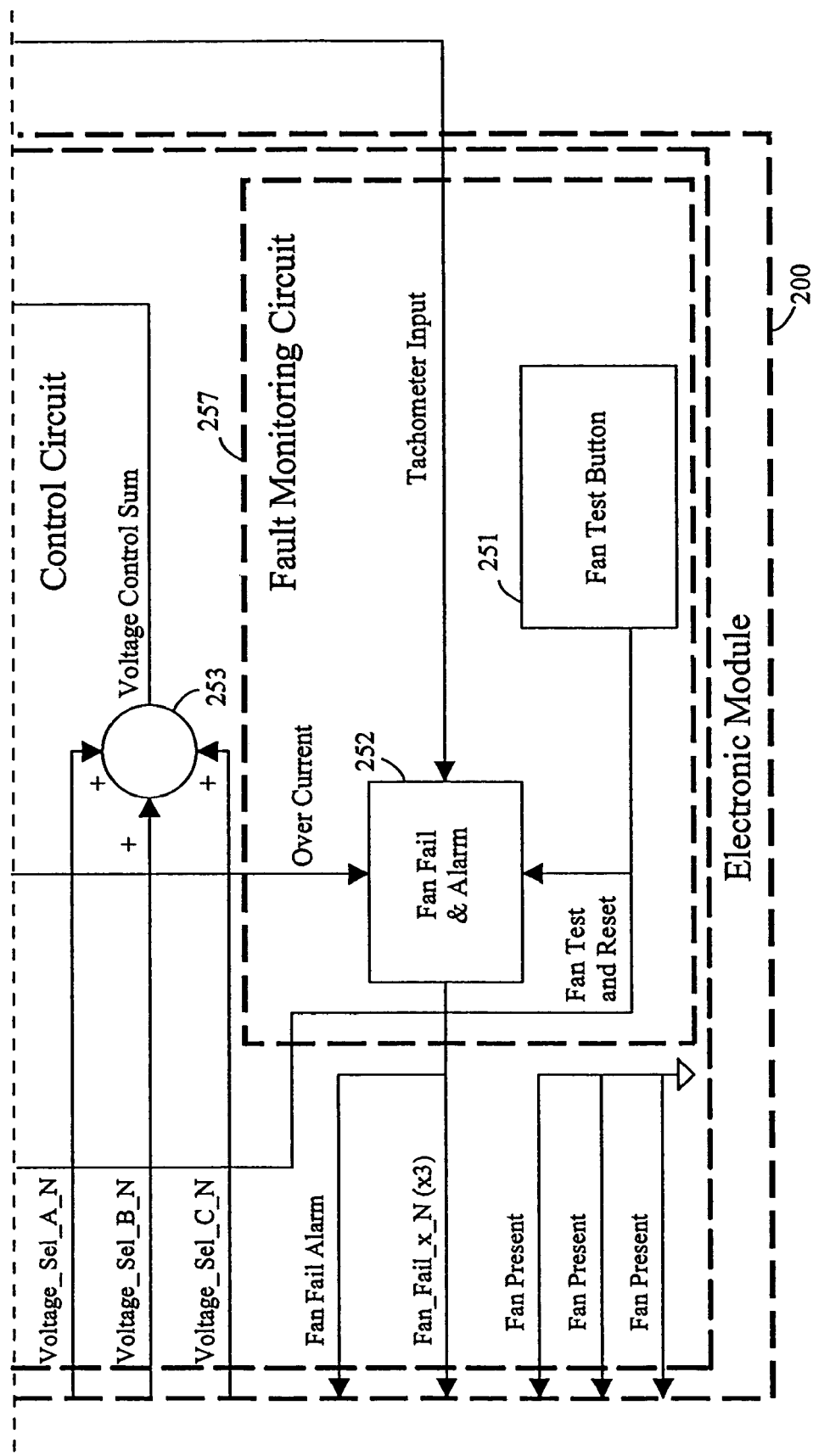

FIG. 2 comprising FIGS. 2A and 2B is a block diagram of one embodiment of the present invention. Electronic module 200 includes input sharing circuit 260 and control circuit 250. In this embodiment, electronic module 200 provides the power necessary to drive the auxiliary equipment, a fan 280, at varying power levels to provide cooling for a remote assembly such as remote assembly 100 of FIG. 1.

Due to the constraints on power from a central office, remote assemblies such as remote assembly 100 of FIG. 1 are power and voltage limited systems. In one embodiment, less than 100 watts and less than 200V to ground is available to power a remote assembly such as remote assembly 100. In some embodiments, the available power at a remote assembly may be further reduced by the total power allowed for a shelf, rack or bay of electronic assemblies at the central office. In this embodiment, electronic module 200 receives voltage inputs from up to three remote units A, B and C.

The cooling required within a remote assembly such as 100 of FIG. 1 increases as the number of installed and operating remote units 125 increases. To accommodate the cooling requirements, in one embodiment fan 280 is a variable speed thermostatically controlled fan. Fan 280 is controlled based on the number of installed and operating remote units and a temperature sensitive switch (on/off control.) In one embodiment, the power required to power fan 280 is less than 1 Watt per line powered remote unit. In one embodiment, electronic module 200 receives 10 Volts of input voltage from one or more remote units, 10V_A, 10V_B, and 10V_C, respectively. Electronic module 200 provides power to drive fan 280 at variable speeds based upon the input voltages V_A, B, or C from the remote units. In one embodiment, fan 280 is a 12V fan. The power available to be supplied by electronic module 200 to fan 280 increases based upon the number of remote units installed and operating.

In one embodiment, electronic module 200 provides for current and inrush limiting, fault monitoring and shut down. Control circuit 250 includes control circuitry 255-1 to 255-R for current limiting/inrush limiting for each voltage input 10V_A, 10V_B and 10V_C, respectively. Inrush current limiting is provided to reduce transients on the remote unit power supply. Input power sharing circuit 260 includes an input switch and current limiter 264-1 to 264-R coupled to each of the current limiting/inrush limiting control circuits 255-1 to 255-R, respectively. Each of inrush limiter circuits 264-1 to 264-R is enabled for only one remote unit requesting the fan 280. When an over current situation is detected a signal is provided to the fan fail and alarm circuit 252. In addition, a soft start signal is provided by the input switch and current limiter circuit 264 to the pulse width modulator power stage and output filter circuit 268. The input switch of circuits 264 performs two functions. During normal operation the switch is fully turned on. This applies the 10 Volts to the PWM circuit and output filter 268 acting as an on/off switch. For abnormal operation this switch is used to limit the current from the input circuitry. Input current limiting is necessary as a short of the 10V input will collapse the 10 Volts on each of the remote units A, B, and C. The normal operating state for the input switch of 264 is off. In this embodiment, whenever the temperature of one of the remote units A, B or C exceeds its thermostat temperature the input switch is commanded to turn on. The power remains on until either the temperature drops below the thermostat temperature or an over current fault or tachometer fault is detected. In other embodiments, with alternate auxiliary equipment other operating parameters will be employed. For example in a system powering a pressurization circuit whenever the pressure detected at one of the remote units or within a remote assembly reaches a desired pressure or is below a desired pressure the input switch is commanded to turn on.

Each remote unit provides a Fan_On_x (Note: _x is used as a wild card for _A, _B, or _C) signal to turn on control circuits 254-1 to 254-R. Control circuit 250 utilizes this signal to control fan 280 applying power to fan 280 only when needed. This results in an open loop temperature speed control circuit. In one embodiment, control circuit 250 includes fault monitoring circuitry 257. In one embodiment, fault monitoring circuit 257 includes a fan fail and alarm circuit 252 that provides an alarm and a fault output signal to each of the remote units, Fan Fail Alarm and Fan_Fail_x_N (N at the end of a signal name indicates negative true logic, that is, logic 0 is true), respectively. In one embodiment, the alarm is a visual alarm such as an LED. The alarms are active only when a Fan_On_x_N input signal from remote units A, B, or C is present. Fan fail & alarm circuit 252 also receives tachometer input signals from fan 280 and over current signals from one or more of input switch and current limiter circuits 264-1 to 264-R. In one embodiment, a slow fan speed, a stalled fan, or an over current failure initiates an alarm. In one embodiment, the fan fail and alarm circuit 252 will output a logical 0 whenever a fault is detected.

In one embodiment, each of remote units A, B, and C has a solid-state thermostat such as thermostat 130 of FIG. 1. Turn on control circuits 254 receive a signal from one or more thermostats and will turn on fan 280 by grounding the Fan_On_x_N input at a desired temperature. The signal that normally is generated by the hottest of the remote units will enable electronic module 200 to power fan 280. In one embodiment, the circuitry associated with electronic module 200 is not powered until one of the Fan_On_x_N signals is received to minimize the stand by requirements.

For an over current failure fan fail and alarm circuit 252 will turn off and latch the electronic module 200 off. In one embodiment, electronic module 200 is reset by toggling the Fan_On_x_N or Fan_Test_N (the fan test push button 251) input or by cycling the power to the remote units. In addition, the natural lowering of the temperature detected by the thermostat may reset the over current latch. In one embodiment, at this point the alarm will also clear, even if the fault is still present.

In one embodiment, fault monitoring circuit 257 further includes a fan test momentary push button switch 251 for local test of the electronic module 200. In one embodiment, power from at least one of the remote units A, B, or C must be received for this test function to work.

Input power sharing circuit 260 includes an input switch and current limiter 264-1 to 264-R and input filter 266-1 to 266-R for each input voltage V_A, B, and C. Input power sharing circuit 260 further includes pulse width modulator power stage & output filter circuit 268 that operates as a power switching regulator and regulates the power to fan 280. The power provided from each operating remote unit A, B, and C is shared to power fan 280 at variable speeds. In one embodiment, input power sharing circuit 260 is as described in the '897 patent.

In one embodiment, voltage control is accomplished by the grounding of 1 or more of the Voltage_Sel_x_N inputs by voltage control summer 253. It is assumed that these grounds will not be applied by a remote unit unless it is installed and powered. One, two or three remote units may power fan 280. Voltage control summer 253 controls the value of the voltage output to fan 280. In one embodiment, driving a 12V fan at one of three voltages (9 Volts, 10.5 Volts, or 12 Volts) depending on the number of installed and powered remote units, 1, 2 or 3, respectively.

Figure 3A:
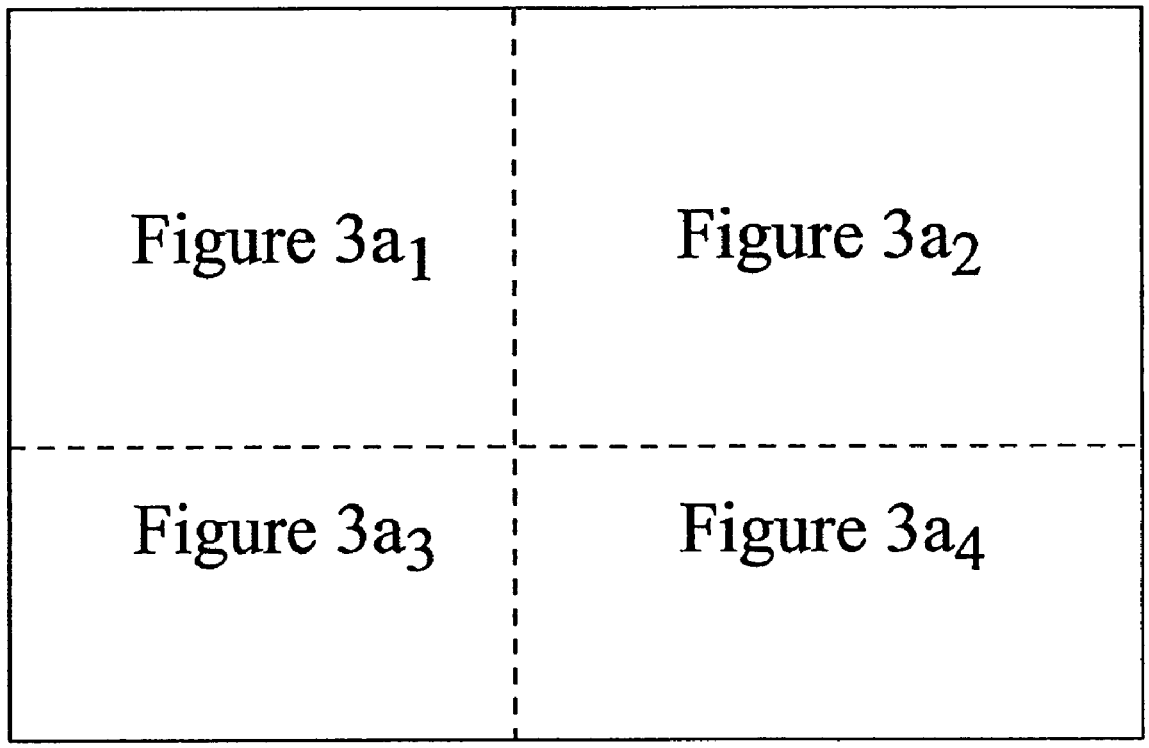

FIGS. 3A(1-4) and 3B(1-4) combine to provide one embodiment of schematics for the electronic module 200 of FIG. 2. Note that the schematics are not designed to restrict the invention in any manner. FIGS. 3A (1-4) and 3B (1-4) illustrate one embodiment of the present invention based on input from three remote units A, B and C. The circuitry required for each 10V input is substantially identical therefore discussion will be restricted to operation with respect to only one circuit based on a 10V input from remote unit A.

The current limiting function is implemented for the 10 Volt input from remote unit A. The current limiting and inrush limiting control has two parts. One is the addition of capacitors gate to source (C15) and gate to drain (C8) to power switching transistor (Q3). In one embodiment, switching transistor Q3 is a MOSFET. The other is a current sensing circuit consisting of Q21, Q22, Q32, R75, R76, R54, R55 and CR26. Capacitor C8 implements a "Miller" capacitor, which increases the AC feedback from the drain to gate. This capacitor connection results in a negative feedback circuit that limits the rise and fall times of the drain voltage of Q3. The time to charge or discharge this capacitance is a direct function of R9 and R10. The current defined by the parallel combination of R9 and R10 sets the turn on time of Q3. The current defined by R10 sets the turn off time of Q3. Since the circuit causes the output voltage at the drain of Q3 to ramp during on and off transitions, the current into capacitive loads is limited by the designed dv/dt of the Q3 drain voltage. For the values of components selected for this example the current is limited to about 200 mA during turn on.

For the current limiting function, the circuit associated with Q21 and Q22 implements a current mirror. R55 sets the initial bias voltages at the bases of Q21 and Q22. The current in R75 sets the current in R76. The current in R76 is approximately the ratio of R75/R76 times the current in R75. In this case, the current ratio is about 1 mA/1 Amp. As the current in R75 rises the current in R76 increases at the rate of 0.001 times the current in R75. The R76 current is also seen at the collector of Q21 as $Ie*\beta/((\beta+1))$. This current causes the current in R54 to rise, which causes the voltage across R54 to rise. Whenever the voltage across R54 forward biases Q32 base-emitter and CR26 the gate to source voltage of Q3 is controlled by Q21. At this point negative feedback begins. As the current tries to increase, more current is injected into R54 that begins to turn off Q3. This negative feedback regulates the current through R75 to a constant level that is dependent on the gate voltage that defines linear operation (sometimes called the pedestal voltage). Since the gate voltage for linear operation is the input voltage minus the pedestal voltage there will be changes in the current limit point due to variations in both the input voltage and the pedestal voltage.

Q22 is shorted base to collector, which looks like a diode connection, but also looks like a unity gain connection, Q22 is used for temperature compensation of the current mirror. An additional benefit of using a transistor instead of a diode (or eliminating the transistor) is the temperature compensation provided by Q22. In one embodiment, Q21 and Q22 is a matched pair. In another embodiment, Q21 and Q22 are replaced with a dual transistor, two discrete transistors of the same type, two transistors of different types.

In operation, the forward bias of Q32 base to emitter junction also initiates current out of the collector of Q32. This applies a current into R72 through R96 that turn on Q25. When Q25 begins to turn on it begins to sink current through CR20 and R70. The current through CR20 causes Q18 to turn on which turns off Q3. The current through R70, also caused by the turn on of Q25, turns on Q35 causing Q25 to turn on. This positive feedback continues until the circuit is reset by Q13 or the removal of all input power.

The input switch (Q3) performs two functions. During normal operation the switch is fully turned on. This applies the 10 Volts to the PWM circuit and output filter acting as an on/off switch. For abnormal operation this switch is used to limit the current from the input circuitry. Input current limit is necessary since a short of the 10V input will collapse the 10V on each of the installed remote units (a single point failure), and keep them off until the short is removed. The normal operating state for the switch Q3 is off. Whenever the temperature of one of the remote units exceeds its thermostat temperature, the switch Q3 is commanded to turn on. The power remains on until either the temperature drops below the thermostat temperature or an over current fault or tachometer fault is detected. When the Q3 drain to source voltage increases to about 1.5 volts, Q11 is turned on. Thus the voltage on R44 is pulled high which increases the voltage at the PWM regulator above its reference voltage of 2.5 volts. This effectively turns off the PWM switching drive and sets the initial conditions for soft start up at the next power on command by charging C24 and C29 through R27.

In one embodiment, the turn on control circuit is comprised of CR25, CR33, R98, R91, Q27 and the circuitry associated with Q26. Diodes CR30, CR31, and CR32 implement a diode OR of the voltages from the input 10 Volt sources. This allows a limited number of low power circuits to maintain power when the fan is not needed. In one embodiment, in addition to the turn on function, this function also performs one or more of:

a. Enable the turn on of Q3, Q4 and Q5
b. Reset the over current latch during turn on
c. Enable the fault monitor
d. Enable the PWM soft start circuit
e. Provide a fan test function (fan test button)

Turn on is accomplished by grounding the Fan_On_A_N input or Fan_On_B_N or Fan_On_C_N. All three of the turn on circuits and the Fan_Test are coupled (logical OR) so that only one command is necessary to turn on all of the switches.

In one embodiment, the input circuit is a solid state thermostat (LM56) located on one or more of the remote units. The input is buffered with Q27. The ground is applied to the cathode of CR25 by the thermostat. The current through R98 forward biases CR33. The voltage at the anode of CR33 is therefore the sum of the saturation voltage of the LM56 and the CR25 forward voltage. To ensure that Q27 can be turned off CR33 was added to subtract a diode forward drop from the voltage at the anode of CR25. CR33 is maintained in a forward biased condition by the current through R98 and R91. When the Fan_On_A_N is grounded Q27 turns off and Q26 turns on and Q31 turns off. Q26 turning on allows the power switch to begin to ramp to its on state. Q31 turning off turns off Q13 that releases the gate of Q25 and enables the current shutdown latch function.

When the Fan_On_A_N input is open Q13, Q27 and Q31 are on, and Q26 is off. With Q26 off Q3 is off, the output is disconnected. With Q13 on, the Q25 is off and the over current latch is reset.

The Fan_Test circuit is simply a momentary push button that applies a ground (logic 0) when pressed and held to the turn on control circuit. The Fan_Test operates identically to the Fan_On inputs. In one embodiment, the Fan_Test ground is applied with a mechanical switch closure to ground rather then a semiconductor switch closure to ground. The Fan_Test circuit also resets the fault latch if the alarm is active.

Figure 3B:
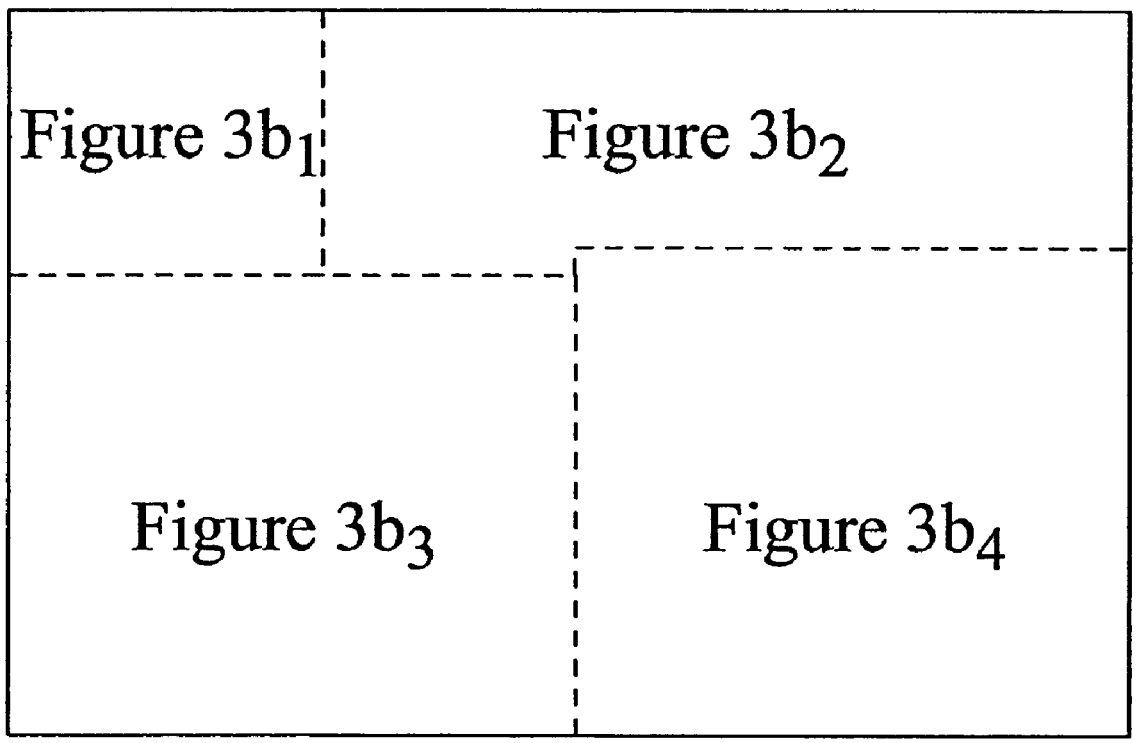

The circuitry continues with FIG. 3B. In one embodiment, the input filter 266 of FIG. 2 is an LC filter represented as L5, C5 and C20 in FIG. 3B with a corner frequency of 4.1 KHz. In another embodiment, input filter 266 needs to provide adequate attenuation of the 200 KHz frequency components of the PWM circuitry. It should be noted that this filter does not provide attenuation of the commutation frequency of the fan motor.

A programmable output voltage PWM power supply controls fan speed and power. In one embodiment, the components associated with U1 and Q2 form the PWM power supply.

In one embodiment, the PWM power stage is comprised of CR4 (CR3 and CR2), L3 (L2 and L4), Q2, CR1, R28 and the circuitry associated with U2 (UCC3813-0). The circuit is implemented as a discontinuous boost converter; that is, the output voltage must be higher than the input voltage. Diodes CR4, CR3 and CR2 are used to prevent the voltage from back feeding from one (or two) remote units to an unpowered or lower voltage remote unit. The use of three separate inductors L3, L2 and L4 enables the forced sharing of power between the various remote units powering the circuit. The peak current in each of inductors L3, L2 and L4 is a function of the DC input voltage, inductance and PWM on time. Since identical circuits (within component tolerances) feed each of the inputs, the voltages are approximately equal. The three inductors are designed for the same inductance; again they will be different only by their inductance tolerances. The PWM on time is identical for all of the inductors. Therefore, the inductor currents will be different from equality only the by the tolerances of the input voltages and inductances. The control loop must be stable whether 1, 2 or 3 of the inductors is receiving power.

In one embodiment, the PWM circuitry is a standard current programmed control using the UCC3813 operating at 200 KHz. The UCC3813 has an under voltage lock out function. The UCC3813 turns itself on at 7.2 Volts and off at 6.9 Volts. The 5V reference is used to power portions of the fault monitor.

Feedback is taken from the output by R2 and applied to inverting input of U2, where the voltage is divided by R1 and the programming resistors (R6, R7 and R8) to 2.5 volts.

In one embodiment, voltage control is accomplished by the grounding of 1 or more of the Voltage_Sel_x_N inputs. It is assumed that these grounds will not be applied by a remote unit unless it is installed and powered. In one embodiment, the output voltages are as follows:

| | | |
|---|---|---|
| a. All inputs open | Vo = 5.0 Volts | No input power |
| b. One input grounded | Vo = 9.0 Volts | One remote unit operating. |
| c. Two inputs grounded | Vo = 10.5 Volts | Two remote units operating. |
| d. Three inputs grounded | Vo = 12.0 Volts | Three remote unit operating. |

Since 5.0 Volts and 9.0 Volts are both below the output voltage with 10 Volts applied the PWM error amplifier will saturate low (or turn off, 5 Volts is below the turn on voltage of this embodiment of the PWM regulator.) This forces the error signal to fall below the internal diode drop that forces a 0% duty ratio (Ton=0). Thus for only one remote unit operating the circuitry operates in its most efficient mode, no switching. For the 10.5 volt and 12 volt output, the PWM circuitry is active, regulating the output voltage to the desired programmed voltage.

For example, the output voltage could just as easily have been set to 10V, 11V and 12V, or 11V, 12.5V and 14V but the case of no switching would not occur, and 14V is the fan absolute maximum rating for this embodiment. Due to design restraints of only 1 W of available power per remote unit requiring the boost supply to provide an unregulated voltage (no switching) below the power supply set point was essential. The output voltage in this embodiment is sufficient to properly power the selected 12V variable speed fan.

The fan alarm receives the tachometer input from the fan and issues an alarm if the fan is running slow or if the fan stops rotating. The tachometer fault monitor consists of the circuitry around Q1, Q24, Q28, Q29, Q30 and Q12. The circuit creates a ramp signal that is reset on the positive edges of the tachometer input signal. The amplitude of the ramp signal is used to determine if the tachometer has fallen below the fault frequency.

The open collector signal from the fan tachometer is AC coupled by C12. This AC coupling performs two functions. By AC coupling the tachometer input a failure either high or low is detected. The small value of the AC coupling capacitor differentiates the input signal, which applies a pulse of current to the base of Q1. The duration of the pulse is determined by the values of C12 and R20. This current pulse momentarily turns on Q1. Diode CR9 protects Q1 against excessive reverse bias-emitter voltages. The pulse generated by Q1 turns on Q29 and Q30 to discharge Q28 (reset the ramp circuit). When Q29 and Q30 turn off, C28 is supplied charging current by R26. The voltage of C28 determines the voltage and hence the current in R84. The current in R84 drives the current in R30 as defined by the emitter current of Q28 and the current gain of Q28.

As the frequency input from the tachometer input falls from its normal operating frequency the time between positive tachometer input signal edges increases. This increases the time between resets of the ramp circuit. As the frequency decreases the peak voltage of C28 increases which increases the peak current in both R84 and R30. When the peak current in R30 causes the voltage across R30 to exceed 5.7 volts (approximately Vref+Vbe_Q12) Q12 turns on. The Q12 collector is connected to the over current latch circuit via R90 to the base of Q35 (FIG. 3A). Therefore, whenever the tachometer signal fails to reset the ramp circuit the over current latch is activated. The result of this activation is to turn off all of the input switches and to issue a fan alarm.

In one embodiment, the tachometer fault circuitry is inhibited during turn on and fan start by the combination of Q24, R15, R16, C11 and C27. In this embodiment, these components limit the current available to charge the filter capacitors by slowing the rate of rise of the voltage to the filter capacitors. The current at turn on is defined by the charging current, the fan current and circuit bias currents. These combined currents are less than the current limit defined by the current limiting circuitry.

These components delay the application of a ground connection to R26. With no ground connection for R26 the ability to charge C28 is removed, thus preventing current flow into R30 as a result of charging C28. The two 1.0 MΩ resistors and the two 1.0 μF capacitors combine to delay the turn on Q24 for about 1 second after a Fan_On input is received. Therefore the tachometer is inhibited for about 1 second after the fan is turned on. Diodes CR19 and CR29 provide a fast discharge for C11 and C27 whenever the 5Volt reference is turned off.

The over current circuitry is prevented from being activated at turn on by the "Miller" capacitor C8 and the parallel combination of R9 and RI0. These components limit the current available to charge the filter capacitors by slowing the rate of rise of the voltage to the filter capacitors. The current at turn on is defined by the charging current, the fan current and circuit bias currents. These combined currents are less than the current limit defined by the current limiting circuitry.

The fan alarm is activated by the turn on of transistor Q35. The fan alarm is active only when the Fan_On input is low. The transistor Q35 discussed above also drives the fault monitor output telemetry transistors.

In one embodiment, three fan alarm open collector outputs and a fan fail LED indicator are provided for remote telemetry and local visual fault indications.

The fan test push button resets the fan fail latch and attempts a Fan Turn On. In the event that a fault is present at the turn on the reset function is AC coupled. This allows the fault to appear if the fan test push button is pressed and held. An immediate fault indication when the Fan Test Button is pressed is caused by the over current alarm input, a delayed fault indication is caused by a loss of the tachometer input signal.

What is claimed is:

1. An electronics module, comprising:
   multiple current and inrush limiting control circuits each adapted to receive power from one of a plurality of electronic units, wherein the electronic units are configured to receive power from a line also carrying data signals;
   multiple input switch and current limiter circuits each input switch and current limiter circuit coupled to one of the multiple current and inrush limiting control circuits;
   multiple input filters each filter coupled to one of the multiple input switch and current limiter circuits;
   a pulse width modulator switching regulator coupled to each of the multiple input filters, wherein the pulse width modulator provides power to auxiliary equipment;
   multiple turn on control circuits, each control circuit adapted to receive an on signal from one of the plurality of electronic units;
   a voltage control summer adapted to receive a voltage select signal from each of the plurality of remote units and control the voltage output to the pulse width modulator switching regulator; and
   a fault monitoring circuit.

2. The electronics module of claim 1, wherein the fault monitoring circuit, includes:
   a fan failure and alarm circuit; and
   a fan test and reset circuit.

3. An electronics module, comprising:
   a control circuit, comprising:
      one or more current and inrush limiting control circuits adapted to receive power from one or more communication units, the communication units powered from at least one wire that carries data and power signals;
      one or more turn on control circuits adapted to receive an on signal from at least one of the one or more communication units; and
      a voltage control summer adapted to receive a voltage select signal from each of the one or more communication units;
   an input power sharing circuit, comprising:
      one or more input switch and current limiter circuits coupled to at least one of the one or more current and inrush limiting control circuits;
      one or more input filters coupled to at least one of the one or more input switch and current limiter circuits; and
      a pulse width modulator power stage and output filter circuit coupled to each of the one or more input filters, wherein the pulse width modulator power stage and output filter circuit provides power to auxiliary equipment at varying power levels;

a fault monitoring circuit; and wherein the voltage control summer controls a voltage output to the pulse width modulator power stage and output filter circuit.

4. The electronics module of claim 3, wherein the fault monitoring circuit includes:

a fan failure and alarm circuit adapted to provide an alarm and a fault output signal to each of the one or more line powered remote units; and a fan test and reset circuit for local test of the electronics module.

5. The electronics module of claim 3, wherein the one or more current and inrush limiting control circuits provide a signal to the fault monitoring circuit whenever an overcurrent situation is detected.

6. The electronics module of claim 3, wherein the one or more input switch and current limiter circuits further provides a soft start signal to the pulse width modulator power stage and output filter circuit.

7. The electronics module of claim 3, wherein the voltage control summer controls the voltage output to the pulse width modulator power stage and output filter circuit based on a number of the one or more communication units installed and operating.

8. The electronics module of claim 3, wherein the voltage control summer controls the voltage output to the pulse width modulator power stage and output filter circuit based on a signal from a temperature sensitive switch.

9. The electronics module of claim 3, wherein the voltage control summer controls the voltage output to the pulse width modulator power stage and output filter circuit based on one or more signals from a tachometer.

* * * * *